No. 766,005. PATENTED JULY 26, 1904.
H. C. THOMSON.
IGNITING DEVICE FOR INCANDESCENT MANTLE BURNERS.
APPLICATION FILED NOV. 6, 1902. RENEWED JAN. 26, 1904.
NO MODEL.

Witnesses:
Inventor:
Henry C. Thomson

No. 766,005. Patented July 26, 1904.

UNITED STATES PATENT OFFICE.

HENRY C. THOMSON, OF BOSTON, MASSACHUSETTS, ASSIGNOR TO ELECTRIC GAS LIGHTING COMPANY, OF BOSTON, MASSACHUSETTS, A CORPORATION OF MAINE.

IGNITING DEVICE FOR INCANDESCENT-MANTLE BURNERS.

SPECIFICATION forming part of Letters Patent No. 766,005, dated July 26, 1904.

Application filed November 6, 1902. Renewed January 26, 1904. Serial No. 190,745. (No model.)

*To all whom it may concern:*

Be it known that I, HENRY C. THOMSON, a citizen of the United States, residing in Boston, Massachusetts, have invented a new and useful Improvement in Igniting Devices for Incandescent-Mantle Burners, of which the following is a specification.

My invention relates particularly to the uniting of an auxiliary burner with movable and fixed electrodes in such way that a sequence of delicate operations may successfully turn the main gas-cock so as to admit gas to the main burner-tip and simultaneously admit gas to the auxiliary or igniting burner and at about the time of issuing of the gas from the auxiliary burner make and break contact between two electrodes and then close the gas-cock of the auxiliary burner and leave the apparatus in such position that when it is desired to turn off the gas from the main burner this may be done without causing contact of the electrodes.

My invention consists in certain novel parts and combinations, as will be plain from the drawings, in which—

Figure 1:
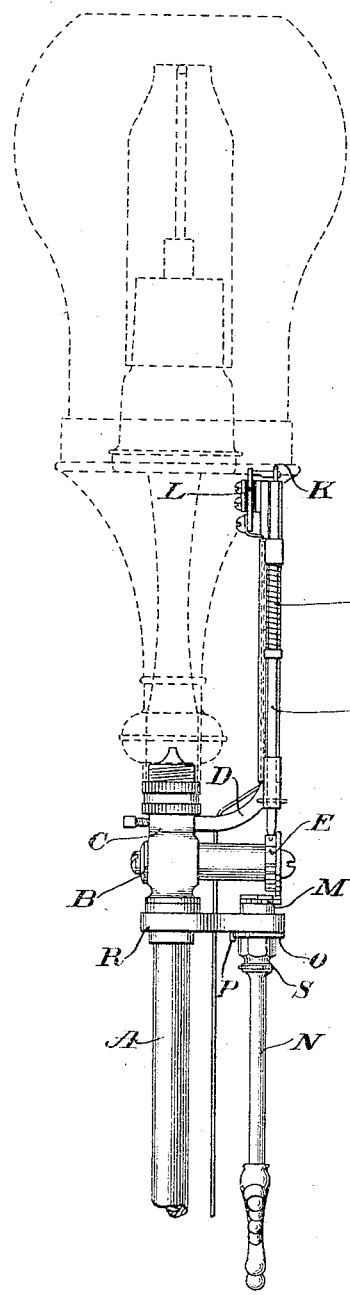
Figure 2:
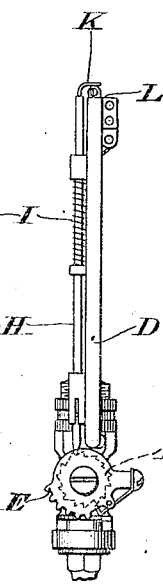
Figure 3:
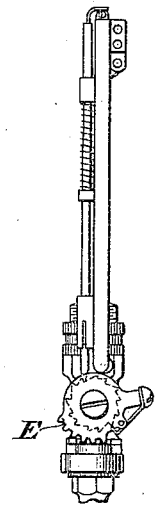
Figure 4:
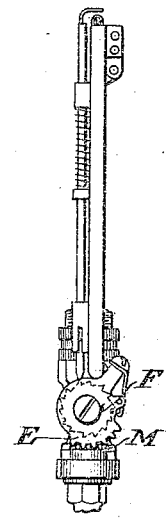
Figure 5:
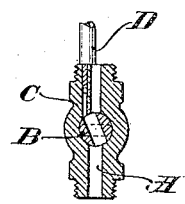
Figure 6:
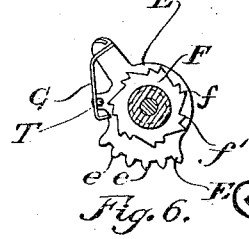

Figure 1 is an elevation showing only in outline the incandescent mantle. Fig. 2 is an elevation of the operating mechanism, showing the gas turned entirely off and the electrodes separated. Fig. 3 shows the gas turned on slightly and the electrodes just about to break contact. Fig. 4 shows the gas turned on and the electrodes separated to their widest extent. Fig. 5 is a section showing the gas-cock which turns the gas on and off from both the auxiliary and the main burner. Fig. 6 is a plan of the toothed plate and the ratchet-wheel by which the movable electrode is operated, as hereinafter described.

I will now describe the drawings.

A is the main gasway; B, the gas-cock constructed, as best shown in Fig. 5, with the auxiliary gasway C, so that oscillation of the gas-cock opens or closes both the auxiliary and the main gasway.

D is the auxiliary gasway; E, the plate carrying the toothed ratchet F, which, it will be noticed, has alternately a deep and a shallow tooth $f\,f'$.

G is the pawl, which, it will be noticed, passes over the teeth $f\,f'$ when the plate G moves backward.

H is the rod of the movable electrode and rests always in or upon the apex of a tooth of the ratchet-wheel F in order to be raised and lowered by the revolution of said ratchet.

I is a spiral spring normally pressing the rod H downward; K, the movable-electrode tip; L, the fixed electrode.

R is a standard extending from the burner-pipe A for the purpose of supporting the handle N, which oscillates the plate O until stopped by the stop P and extending through said standard carries the toothed plate M.

S is a threaded nut which holds the handle in place.

T is a stop preventing pawl G from resting in the deep notches of the ratchet-wheel F.

The operation of my invention will now be plain. Its main object is to have the flame made at the top of the auxiliary burner ignite the gas which issues in the mantle-burner. (Shown in outline in Fig. 1.) The gas being turned off, as shown in Fig. 1, upon turning the handle N the teeth M will gear with the teeth $e\,e$ on the plate E, thereby partially rotating said plate, which by the attached pawl G causes partial revolution of the ratchet-wheel F. The plate E being attached to the gas-cock B operates the same. As the ratchet-wheel revolves the rod H of the movable electrode K will drop, bringing tip K into contact with the fixed electrode L but as the ratchet further revolves the movable electrode will be raised from the fixed electrode, thereby causing a spark to ignite the gas issuing from the auxiliary burner, leaving the movable-electrode rod H in a little tooth $f'$, whereby the movable-electrode tip will be out of contact with the fixed electrode. The full quarter-turn of the key always leaves the rod H at rest in a little tooth $f'$. When now it is desired to turn off the gas, a rotation in the reverse direction of the handle will return the plate E to position; but the pawl G will slide over the surface of the teeth and its position will not be changed nor the electrode-rod moved.

Having described my invention and its operation, what I claim is—

1. As an igniting device for incandescent-mantle burners, the combination of a handle, a supporting-standard carrying said handle, a toothed plate on said handle, a second toothed plate pivoted rigidly to the gas-cock and moved by said first plate, a ratchet-wheel having the unequal teeth $f$ $f'$ loosely on the gas-cock spindle, a pawl G to operate said ratchet-wheel, a movable-electrode rod resting on the teeth of said ratchet-wheel, a helical spring adapted to force the electrode in a downward position, an auxiliary gasway having its orifice contiguous to said movable and fixed electrodes, a main gasway, and a gas-cock adapted to turn on and off the gas from both the auxiliary and the main gasways; substantially as described and shown.

2. In combination with an incandescent-mantle gas-burner, an auxiliary gasway, movable and fixed electrodes at the orifice thereof, a gas-cock adapted to open and close the main gasway of the burner and the auxiliary gasway, and a ratchet-wheel loosely on said gas-cock, a toothed plate rigidly on said gas-cock, and a handle connected with said toothed plate for operating said gas-cock and said movable electrode so as to simultaneously turn on the gas in the main burner and in said auxiliary burner and make a spark to ignite the gas at the orifice of said auxiliary burner; substantially as described and shown.

In witness whereof I hereunto subscribe my name this 1st day of November, 1902.

HENRY C. THOMSON.

Witnesses:
 FRED C. CHAMBERLIN,
 MARY I. YARRAGHAN.